May 8, 1951

A. P. J. H. HUET 2,552,044

DIRECTLY FIRED WASTE HEAT BOILER

Filed June 3, 1947

ANDRE P. J. H. HUET
INVENTOR.

BY James J. Whalen

ATTORNEY

Patented May 8, 1951

2,552,044

UNITED STATES PATENT OFFICE 2,552,044

DIRECTLY FIRED WASTE-HEAT BOILER

André Philippe Jean Hilaire Huet, Paris, France, assignor to Combustion Engineering-Superheater, Inc., a corporation of Delaware Application June 3, 1947, Serial No. 752,223
In France September 24, 1945

Section 1, Public Law 690, August 8, 1946
Patent expires September 24, 1965

1 Claim. (Cl. 122—7)

The present invention relates to a boiler capable of using at one time waste heat gases from a motor or other source and/or as an alternative heat directly produced by fuel burners.

According to the invention the fuel burner or other instrumentality producing direct heat is preferably placed in a central part of the boiler where combustion takes place and a first transfer of heat is effected. The waste gases preferably enter the boiler at the end opposite to the location of the fuel burners and are added to the combustion gas produced by the latter and with this gas, or circulating alone, are discharged into a second pass of the boiler which is preferably concentric with the furnace. The gases after flowing through this pass discharge through a stack.

At the location where the gases of combustion and waste heat gas mix, a deflector is provided, constructed and disposed so that the flow of one of the gases does not interfere with the flow of the other, but on the contrary acts by aspiration to draw them through the boiler towards the stack.

One method of constructing such a boiler consists in disposing the heat exchange surface in the form of cylindrical water jackets or in the form of small tubes disposed side by side and connected to headers. The fuel is burned in a central fire box and after being cooled by its water walls to about the temperature of the waste heat gas its products encounter a deflector which turns them back towards the burner end of the boiler through a second pass where they mix with the waste heat gas. When the pressure of the waste heat gases is sufficiently high they act to draw the combustion gas into the second pass so that the two streams do not impinge on each other. The deflector can be cooled by radiation to the generating surface of the boiler or to a superheater or an economizer or itself be an active part of one of these elements.

The invention will be best understood upon consideration of the following detailed description of an illustrative embodiment when read in conjunction with the accompanying drawing in which.

Figure 1:
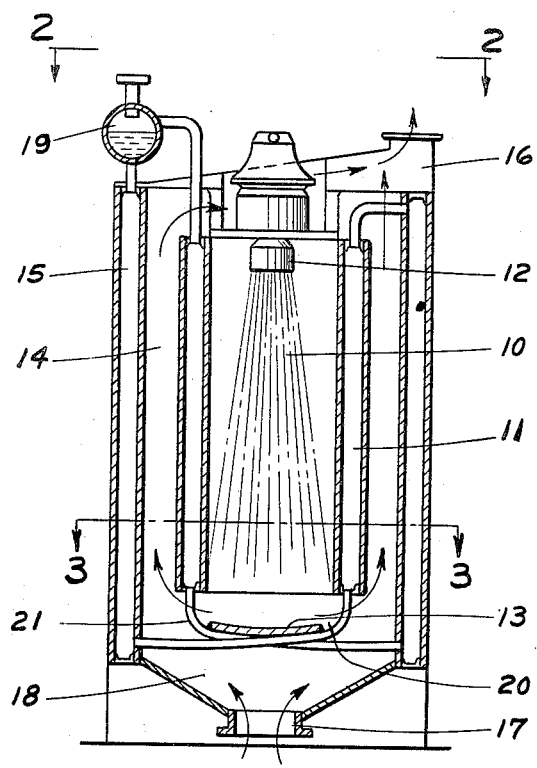
Figure 1 is a sectional elevation of a boiler embodying the invention.
Figure 2:
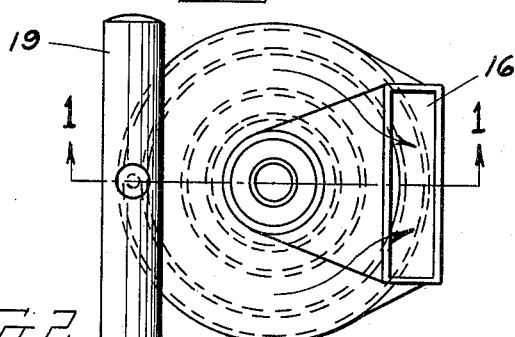
Figure 2 is a plan view.
Figure 3:
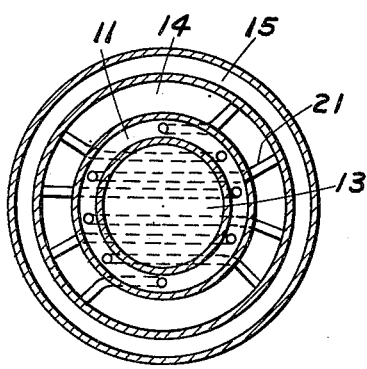
Figure 3 is a section on the correspondingly designated section lines in Figure 1 showing a deflector supported by water tubes.

As may be seen in the drawings the boiler has a central furnace 10 located within a cylindrical water jacket 11. Fuel is introduced into one end of the furnace by the burner 12 producing heat to effect the first mainly radiant stage of heat exchange. At the lower part of the boiler beyond the end of jacket 11 the gases of combustion flowing from the furnace encounter a deflector 13 and are turned by it into a gas passage 14 concentric with the furnace 10 and formed by the water jacket 11 defining the latter and a second outwardly positioned concentric water jacket 15. Waste heat gases coming for example, from a motor or other source flow through an inlet 17 into a foyer 18 at the lower end of the furnace opposite burner 12 and are turned aside by the bottom of the deflector 13 so as to be also directed into the annular passage 14.

An aspirating effect on the products of combustion from the furnace is produced by the waste heat gases flowing over the outlet opening 20 between the upper end of the baffle 13 and lower end of the water jacket 11. Likewise the gases of combustion from the furnace 10, if at higher pressure as they flow from the opening 20 into the annular passage 14, have a similar aspirating effect tending to draw the waste heat gas with them into the passage 14. The steam produced in the jackets 11 and 15 is discharged into a steam and water drum 19 and the waste heat gases are discharged through the stack 16 connected with the upper end of annular passage 14 at one side thereof.

Since the outer jacket 15 projects beyond the furnace jacket 11 the baffle 13 can be supported by water tubes 21 extending diametrically across the furnace end from the lower end of the water jacket 15 and upwardly to the lower end of the water jacket 11.

Figure 4:
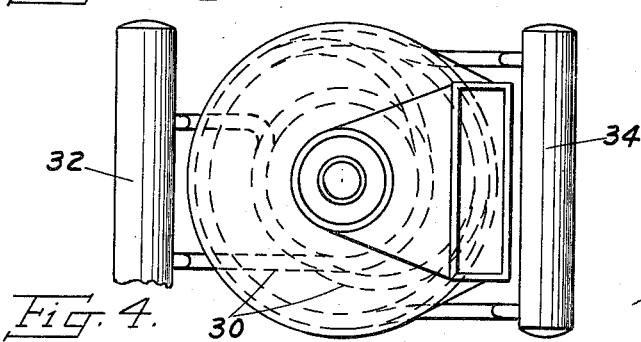
Figure 4 is a plan view similar to Figure 2 but showing the boiler as including steam generating surfaces comprising tubular coils connected to inlet and outlet headers.

It is to be understood that in place of annular jackets 11, 15 the water walls may consist of small diameter tubes 30 connected to suitable headers 32, 34 as shown in Figure 4. The tubes or other surfaces between which the gases flow may or may not be provided with fins. The boiler itself may be of the closed circuit type. It is to be noted that the principal parts of the boiler are rectilinear which makes them easy for cleaning as much so on the gas side as on the steam and water side. It is also to be understood that such a boiler can be provided with a superheater and an economizer disposed in the flues or in the gas passage beyond the generating surface.

What I claim is:

In a heat exchanger having a furnace provided with means for introducing fuel thereto at one end so the products of combustion flow axially of the furnace, wall means forming a foyer at the opposite end of the furnace in communication at one side thereof with the furnace, means forming a return flow gas passage communicating with said foyer, and fluid circulating elements lining the walls of the furnace and gas passage; the combination therewith of means for admitting heat transmitting gases from an outside source to said foyer including an inlet in the wall thereof opposite the side communicating with said furnace; and a gas deflecting baffle mounted in said foyer intermediate the outlet end of the furnace and said inlet, said baffle extending transversely of the foyer outside the limits of said gas passage so as to direct both the products of combustion from the furnace and the gases from said outside source into said passage.

ANDRÉ PHILIPPE JEAN HUET.

REFERENCES CITED

The following references are of record in the file of this patent:

UNITED STATES PATENTS

| Number | Name | Date |
|---|---|---|
| 429,900 | Fish | June 10, 1890 |
| 668,947 | Bell et al. | Feb. 26, 1901 |
| 946,310 | Archer | Jan. 11, 1910 |
| 2,009,852 | Lum et al. | July 30, 1935 |
| 2,065,850 | Black et al. | Dec. 29, 1936 |
| 2,142,409 | Pontremoli | Jan. 3, 1939 |
| 2,216,809 | Derby | Oct. 8, 1940 |